(12) United States Patent
Litzenberg et al.

(10) Patent No.: US 11,618,202 B2
(45) Date of Patent: Apr. 4, 2023

(54) METHOD AND BLOW-MOLDING MACHINE FOR THE BLOW-MOLDING PRODUCTION OF CONTAINERS THAT ARE STERILE AT LEAST IN CERTAIN REGIONS

(71) Applicant: KHS Corpoplast GmbH, Hamburg (DE)

(72) Inventors: Michael Litzenberg, Geesthacht (DE); Martin Gerhards, Hamburg (DE); Thomas Herold, Bargteheide (DE); Dieter Klatt, Hamburg (DE)

(73) Assignee: KHS GmbH, Dortmund (DE)

( * ) Notice: Subject to any disclaimer, the term of this patent is extended or adjusted under 35 U.S.C. 154(b) by 1046 days.

(21) Appl. No.: 15/314,488

(22) PCT Filed: Jun. 23, 2015

(86) PCT No.: PCT/EP2015/001260
§ 371 (c)(1),
(2) Date: Nov. 28, 2016

(87) PCT Pub. No.: WO2016/008562
PCT Pub. Date: Jan. 21, 2016

(65) Prior Publication Data
US 2017/0197352 A1    Jul. 13, 2017

(30) Foreign Application Priority Data
Jul. 13, 2014  (DE) .................... 10 2014 010 283.1

(51) Int. Cl.
*B29C 49/42*  (2006.01)
*B29C 49/78*  (2006.01)
(Continued)

(52) U.S. Cl.
CPC .......... *B29C 49/4273* (2013.01); *B29C 49/12* (2013.01); *B29C 49/36* (2013.01);
(Continued)

(58) Field of Classification Search
CPC .............. B29C 49/121; B29C 49/6418; B29C 49/4273; B29C 49/1212
See application file for complete search history.

(56) References Cited

U.S. PATENT DOCUMENTS

| 4,076,071 A | 2/1978 | Rosenkranz et al. |
| 5,346,386 A | 9/1994 | Albrecht et al. |

(Continued)

FOREIGN PATENT DOCUMENTS

| DE | 19906438 A1 | 8/2000 |
| DE | 102010026166 A1 | 1/2012 |

(Continued)

*Primary Examiner* — Emmanuel S Luk
(74) *Attorney, Agent, or Firm* — Rankin, Hill & Clark LLP

(57) ABSTRACT

A method for the production of blow-molded containers that are sterile at least in certain regions, and a blow-molding machine configured to carry out the method. In accordance with the method, blowing stations are arranged on a rotating blowing wheel. A preform of a thermoplastic material is first heated and then stretched in a blowing station by a stretching rod and subjected to a pressurized blowing fluid via a blowing nozzle. A sterilizing fluid is supplied to the preform in the blowing station to perform a sterilization. The sterilizing fluid is fed into the preform from an outlet and is carried away again via an inlet and in between follows a flow path. The sterilizing fluid is made to pass through or pass by the stretching rod on its flow path, and the sterilizing fluid is supplied while the blow-molding machine continues to operate.

14 Claims, 7 Drawing Sheets

Figure 1:
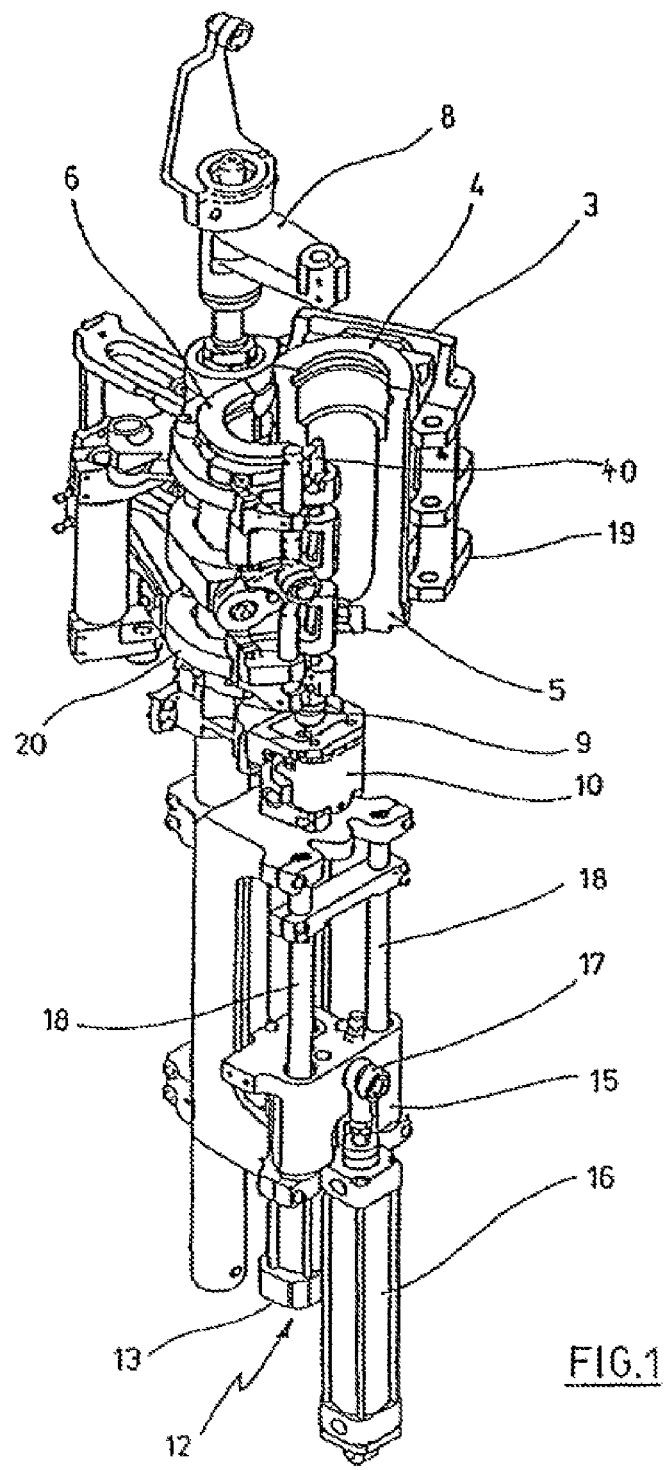

(51) Int. Cl.
  *B29C 49/64* (2006.01)
  *B29C 49/12* (2006.01)
  *B29C 49/36* (2006.01)
  *B29C 49/46* (2006.01)
  *B29L 31/00* (2006.01)
  *B29K 67/00* (2006.01)
  *B29K 105/00* (2006.01)

(52) U.S. Cl.
  CPC .............. *B29C 49/42* (2013.01); *B29C 49/46* (2013.01); *B29C 49/6418* (2013.01); *B29C 49/78* (2013.01); *B29C 49/121* (2022.05); *B29C 49/1212* (2022.05); *B29C 49/4205* (2013.01); *B29C 2049/4635* (2013.01); *B29C 2049/4697* (2013.01); *B29K 2067/003* (2013.01); *B29K 2105/253* (2013.01); *B29L 2031/7158* (2013.01)

(56) References Cited

U.S. PATENT DOCUMENTS

| | | |
|---|---|---|
| 5,648,026 A | 7/1997 | Weiss |
| 6,692,684 B1 | 2/2004 | Nantin et al. |
| 2004/0237466 A1 * | 12/2004 | Grossmann ............. A61L 2/208 53/167 |
| 2010/0047120 A1 * | 2/2010 | Adriansens ............ A61L 2/208 422/22 |
| 2010/0205907 A1 | 8/2010 | Herold et al. |
| 2011/0037187 A1 * | 2/2011 | Winzinger ................ B08B 9/00 264/39 |
| 2011/0133370 A1 * | 6/2011 | Engelhard .............. B29C 49/42 264/535 |
| 2011/0311675 A1 * | 12/2011 | Voth ....................... B29C 49/42 425/526 |
| 2012/0042611 A1 * | 2/2012 | Lappe .................... A61L 2/232 53/426 |
| 2013/0183195 A1 | 7/2013 | Herold et al. |
| 2014/0144105 A1 | 5/2014 | Hayakawa et al. |
| 2016/0001488 A1 * | 1/2016 | Clüsserath ............... B65B 3/10 264/525 |

FOREIGN PATENT DOCUMENTS

| | | |
|---|---|---|
| DE | WO2012/092921 A1 * | 7/2012 |
| DE | 102012010985 A1 | 12/2013 |
| EP | 2008667 A1 | 12/2008 |
| EP | 2138298 A2 | 12/2009 |
| JP | WO2013/021882 A1 * | 2/2013 |

* cited by examiner

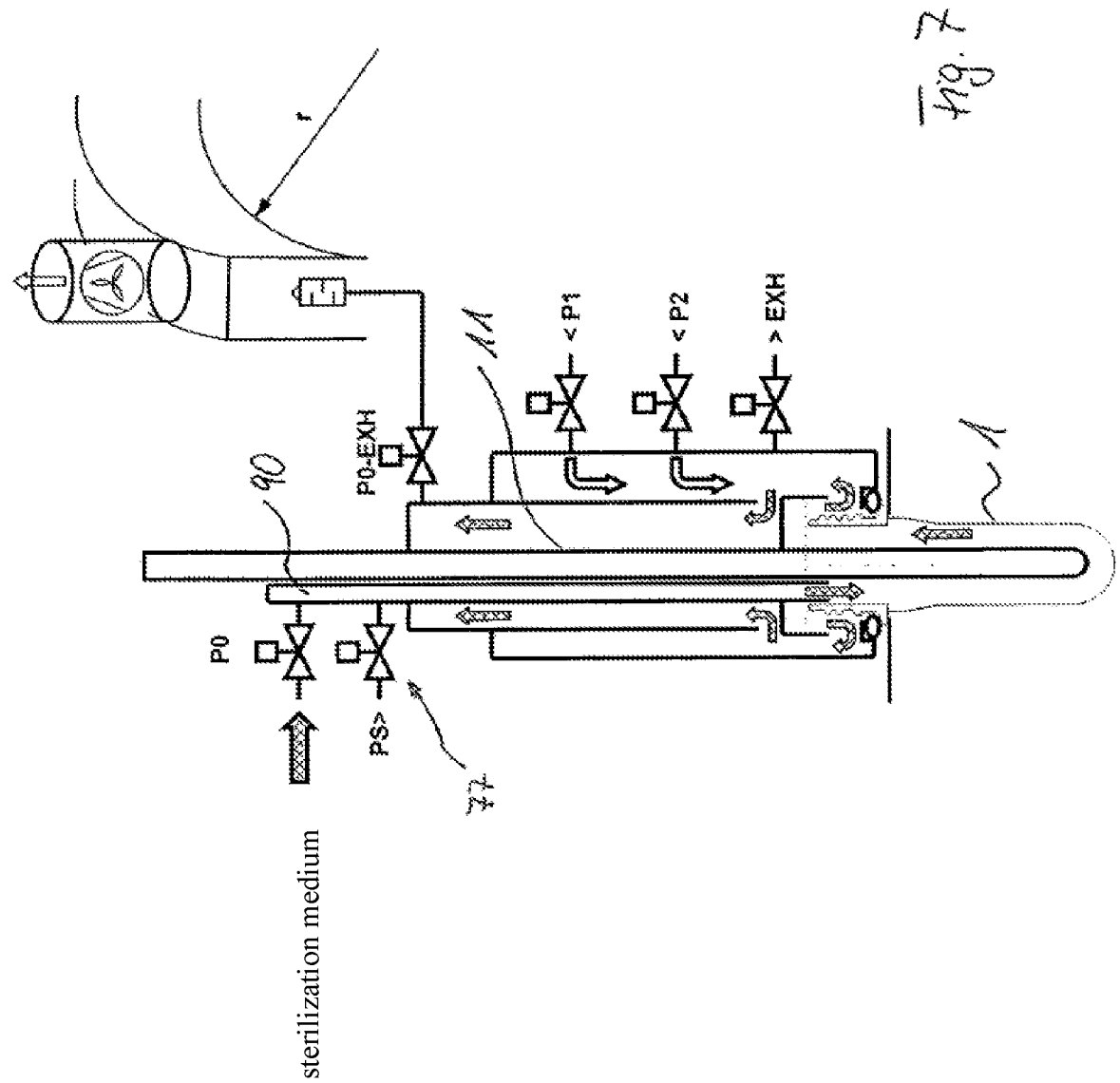

METHOD AND BLOW-MOLDING MACHINE FOR THE BLOW-MOLDING PRODUCTION OF CONTAINERS THAT ARE STERILE AT LEAST IN CERTAIN REGIONS

The invention relates to a method for the production of blow-molded containers that are sterile at least in certain regions in a blow-molding machine, especially in a blow-molding machine with blowing stations arranged on a rotating blowing wheel, in which a preform of a thermoplastic material is at first heated and then stretched in a blowing station by a stretching rod, in particular by a hollow stretching rod, and subjected to a pressurized blowing fluid by means of a blowing nozzle, and in which a sterilizing fluid is supplied to the preform in the blowing station to perform a sterilization, wherein the sterilizing fluid is fed into the preform in the blowing station from an outlet and is carried away again via an inlet and in between follows a flow path, wherein the sterilizing fluid is made to pass through or pass by the stretching rod on its flow path.

Furthermore, the invention relates to a blow-molding machine, especially a blow-molding machine with blowing stations arranged on a rotating blowing wheel, for the production of blow-molded containers that are sterile at least in certain regions, which is provided with a heating section for regulating the temperature of the preforms and with a blowing station for the blow-molding of the preforms into the containers, wherein the blowing station has a stretching rod, and also wherein a sterilization apparatus is arranged in the blowing station, with the features of the preamble of claim 8.

A production of sterile, blow-molded containers is typically done such that these containers after their blow molding and before being filled are sterilized with the use of hydrogen peroxide or other chemicals. Likewise, it is already known how to sterilize the preforms used as starting product in the blow molding of the containers, especially the region of the inner surface of these preforms. The sterilization of the preforms affords the advantage of a reduced consumption of sterilizing fluid, since the preform has a significantly smaller surface than the container blow-molded from it. The drawback is the possibility of renewed microbial contamination on the further transport path of the preform or the container which is blow-molded from it.

In the molding of containers by the action of blowing pressure, preforms of a thermoplastic material, such as preforms of PET (polyethylene terephthalate), are fed to various processing stations within a blow-molding machine. Typically, such a blow-molding machine has a heating apparatus as well as a blowing station, in which area the previously temperature-regulated preform is expanded into a container by biaxial orientation. The expansion is done, e.g., with the aid of pressurized air, which is introduced into the preform being expanded by means of a blowing nozzle. The course of the process during such an expansion of the preform is explained in DE-OS 43 40 291.

The fundamental layout of a blowing station for molding of containers is described in DE-OS 42 12 583. Possibilities for temperature regulation of the preforms are explained in DE-OS 23 52 926.

Within the blow-molding device, the preforms as well as the blown containers can be transported with the aid of various handling appliances. In particular, the use of transport mandrels onto which the preforms are shoved has proven to work well. But the preforms can also be handled with other carrying appliances. The use of gripping pliers for the handling of preforms and the use of spreading mandrels which can be introduced into a mouth region of the preform for the holding process are also part of the available designs.

A handling of containers with the use of transfer wheels is described for example in DE-OS 199 06 438 for an arrangement of the transfer wheel between a blowing wheel and an output section.

The already explained handling of the preforms is done on the one hand in the so-called two-step method, wherein the preforms are at first produced in an injection molding process, then placed in temporary storage and only afterwards regulated in terms of their temperature and blown to produce a container. On the other hand, the so-called single-step method is used, in which the preforms are suitably temperature-regulated and then blown immediately after their injection molding production and an adequate consolidation.

In regard to the blowing stations used, various designs are known. In the case of blowing stations which are arranged on rotating transport wheels (blowing wheels), one often finds mold carriers which can fold open like a book. But it is also possible to use mold carriers able to move relative to each other or otherwise guided. In the case of stationary blowing stations, which are especially suitable for receiving a plurality of cavities for the container molding, one typically uses plates arranged in parallel as the mold carriers.

As regards the sterilization of preforms, various methods and devices are already known from the prior art, yet they all have drawbacks specific to the method which prevent a reliable sterilization of the preforms at the same time as achieving high throughput rates.

For example, in EP-A 1 086 019 the sterilization of hot preforms with a hot gaseous sterilization agent is described. Separate treatment stations arranged in succession are used, namely, a first heating module, a sterilization module, and a second heating module. The drawback here is the temperature behavior of the preform during the sterilization process as well as the uncontrolled emergence of the sterilization agent from the preform during the heating. A further drawback is that the preform after its sterilization still has to travel a substantial transport distance with the danger of renewed microbial contamination.

In EP-A 1 896 245 a method is described in which a gaseous sterilization agent is introduced into a cold preform prior to the heating and condenses there. The problem here is the assurance of a complete condensate formation on the entire inner surface of the preform, since the incoming hot sterilization agent raises the temperature of the inner wall of the preform. Furthermore, here as well the sterilization agent after its evaporation in the heating zone emerges uncontrolled from the preform during the heating. Another drawback here is again that the preform after its sterilization still has to travel a substantial transport distance with the danger of renewed microbial contamination.

EP-A 2 138 298 describes a device in which sterilization appliances are arranged as a precaution both upstream from the blowing module used and also downstream from the blowing module used. The result is a very large expenditure on machine construction.

WO 2010/020530 A1 describes the arrangement of a sterilization apparatus between a heating and the blowing module. In this method, the amount of sterilization agent put into the zone of the blowing module is hard to predict. Furthermore, the amount of sterilization agent emerging into the surroundings is not controllable and accordingly a contamination cannot be ruled out.

After a sterilization and heating of the preforms has been done, they are taken to a blowing station and molded into containers there with the use of sterile blowing air. The supplying of the blowing air and the feeding of the blowing air occurs by means of a blowing nozzle, which lies tightly, e.g., against the preform. During the blow molding of the container, the blowing air flows for example out from the stretching rod or past the stretching rod. Furthermore, the stretching rod comes into contact with both the preform and the blown container in the area of the stretching rod tip. In order to assure an adequate sterility of the blown containers, it is therefore necessary to also arrange for an adequate sterility of the stretching rod. The blowing nozzle should also be kept sterile, in order to prevent microbial contamination of the preforms. Thus far, no reliable yet technically easy to perform method is known for this.

DE 10 2008 038 143 A1 discloses the sterilization of the preform after the end of the heating process in the heating apparatus and before the end of the blow-molding process in the blowing station. For this, a sterilization apparatus is provided regarding which it is stated that it can be integrated in the blow-molding apparatus. It is furthermore explained that the sterilization gas used for the sterilization can be introduced through a hollow stretching rod into the inside of the preforms. Moreover, it is explained that a portion of the expansion process of the container can also be carried out with the sterilization gas. The benefit of this design is seen as being that the sterilization of the preforms occurs at a later time, so that the risk of a new microbial contamination is lessened. At the same time, the advantage is preserved that only the small-area preform but not the large-area container is sterilized. The drawback in this design is seen as being that the problem of assuring an adequate sterility of the stretching rod and the blowing nozzle still remains unsolved. A further drawback is that, according to the teaching of DE 10 2008 038 143 A1, only the inner wall of the preform is subjected to the action of the sterilizing gas. Further drawbacks are that the uncontrolled emergence of the sterilizing gas is not prevented. Neither is the proposed solution favorable for energy reasons if the sterilizing gas has to be introduced into the preform under the required blowing pressure.

The problem which the present invention proposes to solve is to improve a method of the kind mentioned above so that an adequate sterility can be assured in simple manner.

This problem is solved according to the invention by a method such that the sterilizing fluid is supplied while the blow-molding machine continues to operate, in particular wherein the outlet is arranged at least for a time in the vicinity of the bottom of the preform, and in particular wherein the inlet is arranged at least for a time above the outlet, and in particular wherein a continuous flow of sterilizing fluid is produced between the outlet and the inlet and is directed along the preform and the stretching rod and the blowing nozzle.

The problem is also solved according to the invention by a blow-molding machine in which the sterilizing fluid is guided by valve-operated feeding devices so that it sweeps the inner wall of the preform up to and including the sealing surface for the sealing against a container closure to be applied afterwards. For this, the device has valve control means and/or guiding means which are configured and/or arranged to carry out a method according to one or more of the preceding method claims. This device assures an effective sterility of the preform and the critical areas of the blowing machine (stretching rod, blowing nozzle) with little expense.

Further advantageous configurations of the method and the device are indicated in the subclaims.

Advantageously, it is provided that the preform is subjected to the pressurized blowing fluid only after the sterilization with the sterilizing fluid has been finished, and optionally the preform is flushed with a sterile flushing fluid between the sterilization and the blow molding.

The sterilization of the preform within the blowing station occurs at the latest possible time, so that a new microbial contamination of the preform is no longer possible. For an aseptic filling process, it is only necessary to prevent a recontamination of the blow-molded container after the blow molding, for example by taking the container to a clean room or by creating a sterile air tunnel in which the container is moved at least with its still unclosed mouth region. Thanks to the fact that the sterilizing fluid is directed through the stretching rod or past it, and that guiding means direct the sterilizing fluid along the inner wall of the preform up to and including the sealing surface, the stretching rod is also sterilized at the same time in the region of the rod which is critical to a recontamination. In this way, labor-intensive inserting and removing steps which would be needed for an external sterilization of the stretching rod can be avoided. Preferably, the sterilization is done when the blowing nozzle has reached its blowing position, i.e., has been lowered onto the preform to produce a seal. In this way, it is possible to also sterilize the blowing nozzle with the sterilizing fluid. It is seen as a major advantage of the present invention that the critical machine parts of the blow-molding machine in terms of sterility, namely the blowing nozzle and the stretching rod, as well as the preform, are sterilized at the same time. Another benefit of the present invention is that this occurs in ongoing fashion during the manufacturing process, i.e., the critical machine parts are subjected to the sterilization process once more during each revolution of the blowing wheel.

Advantageously, the preform is subjected to the pressurized blowing fluid only after the sterilization with the sterilizing fluid has been finished. Otherwise, the sterilizing fluid would have to be introduced into the preform or the resulting container blowing under a typical preblowing pressure or a typical final blowing pressure, respectively. For example, when evaporated hydrogen peroxide is being used, high temperatures are needed at such a pressure level in order to evaporate the hydrogen peroxide or maintain it in the gas state. This problem is avoided if the sterilization is carried out in the blowing station before the actual blow-molding process.

The sterilizing fluid and the blowing fluid according to the present invention and unlike DE 10 2008 038 143 A1 are different fluids. The sterilizing fluid can be, for example, a sterilizing gas mixture of warm air and evaporated hydrogen peroxide. The blowing fluid is generally sterile air.

Optionally and advantageously, a flushing with a sterile flushing fluid is specified between the described sterilization process and the blow-molding process. This flushing fluid can be, e.g., the blowing fluid, wherein the fluid is introduced into the preform with a pressure less than a typical preblowing pressure as compared to the blow-molding process. For example, the flushing fluid is introduced into the preform with a pressure less than 5 bar, preferably less than 3 bar. Preferably, the fluid is taken through the hollow stretching rod, so as to also remove traces of the sterilizing fluid from the stretching rod and thereby avoid deleterious effects of the sterilizing fluid on the blowing process. A drainage through the hollow stretching rod, for example, leads to worse results than a supply through the stretching rod, on account of fluidic reasons.

Advantageously, it is specified that the sterilizing fluid is also taken across the threaded region of the preform, in order to also sterilize this critical region. For this, appropriate guiding means can be provided in order to predetermine the flow path in the desired manner. In particular, it is possible and advantageous to sweep the external thread of the preform as completely as possible, especially up to the support ring, while designs are also known in which the support ring is replaced by a different handling contour. In the case of such preforms, the sterilizing fluid should be guided so that it sweeps the threaded region of the preform as far as the handling contour.

The guiding of the flow of sterilizing fluid can occur, for example, such that the drainage occurs through the stretching rod and the supplying outside the stretching rod. But a better influencing of the flow path of the sterilizing fluid can be achieved in that the sterilizing fluid is supplied through the stretching rod. Advantageously, in this case, the drainage of the sterilizing fluid occurs through the blowing nozzle, which is provided with an outlet for this, so that no additional drainage device needs to be provided and the blowing nozzle or the critical region of the blowing nozzle in terms of sterility also comes into sterilizing contact with the sterilizing fluid.

As compared to blowing stations with no ability to sterilize the preform in the blowing station, the process time for the blow-molding of the container when the process is organized according to the claim is prolonged by the time needed for the sterilization. In the case of rotating blowing wheels, this can be compensated for example in that the rotating time of the blowing stations is increased. An adequate sterilization—without any excessive increasing of the process time—is achieved by providing a time of action of the sterilizing fluid of 50 milliseconds to 500 milliseconds. The switching valves in control of the inflow and outflow of the sterilizing fluid should be actuated accordingly so that the sterilizing fluid flows through the preform for this mentioned time of action. It is also possible for the time of action to be adjustable, e.g., depending on the substance being filled and depending on the sterilization results the time of action can be prolonged or shortened.

Preferably, the sterilizing fluid used is a mixture of warm air and evaporated hydrogen peroxide. This mixture exhibits an adequate sterilizing effect and is technically easy and economical to produce. For this, an evaporator is required, which evaporates the liquid hydrogen peroxide. This evaporator is preferably arranged on the blowing wheel.

The evaporator is charged with liquid hydrogen peroxide from a hydrogen peroxide reservoir. This reservoir could likewise be arranged on the blowing wheel. It would then need to be dimensioned adequately so that after being filled an adequate operating time is assured before it needs to be refilled. The reservoir could also be arranged outside the blowing wheel and supplied via a rotation transmitting device, e.g. to a pressurized vessel on the rotating blowing wheel, which then supplies the evaporator.

Preferably the sterilizing fluid, i.e. the mixture of evaporated hydrogen peroxide and air, for example, is fed into a distributing ring, from which the hollow stretching rods are supplied with the sterilizing fluid. If the supply does not occur through the hollow stretching rod, then the alternatively selected sterilizing fluid supply means are connected to this distributing ring.

After the sterilizing fluid has flowed through the preforms in the blowing station and been drained away, e.g., via the blowing nozzles, the drained sterilizing fluid is advantageously delivered to a common annular channel, which is arranged stationary, for example, and into which the sterilizing fluid supply means empty at their outlet. From this annular channel the sterilizing fluid can be aspirated, e.g., by means of a fan and taken to another use or to disposal. As an alternative to its recycling, the sterilizing agent can also be neutralized, such as catalytically. Hydrogen peroxide can be catalytically broken down into water and oxygen. Recycling is economically advisable, while neutralization avoids harmful effects of the sterilizing agent.

The benefits described above for the method of the invention hold analogously for the devices according to the invention.

Figure 2:
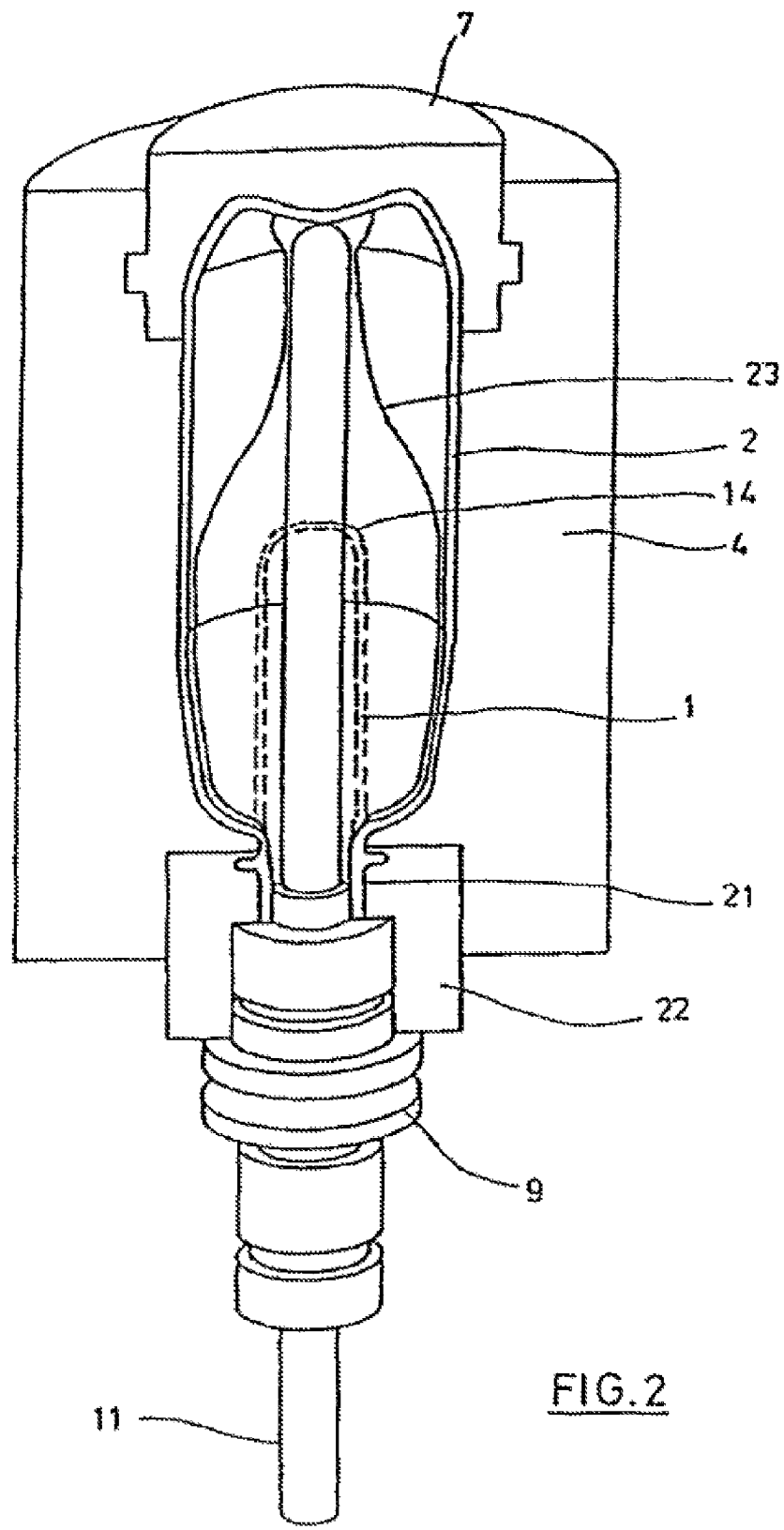
Figure 3:
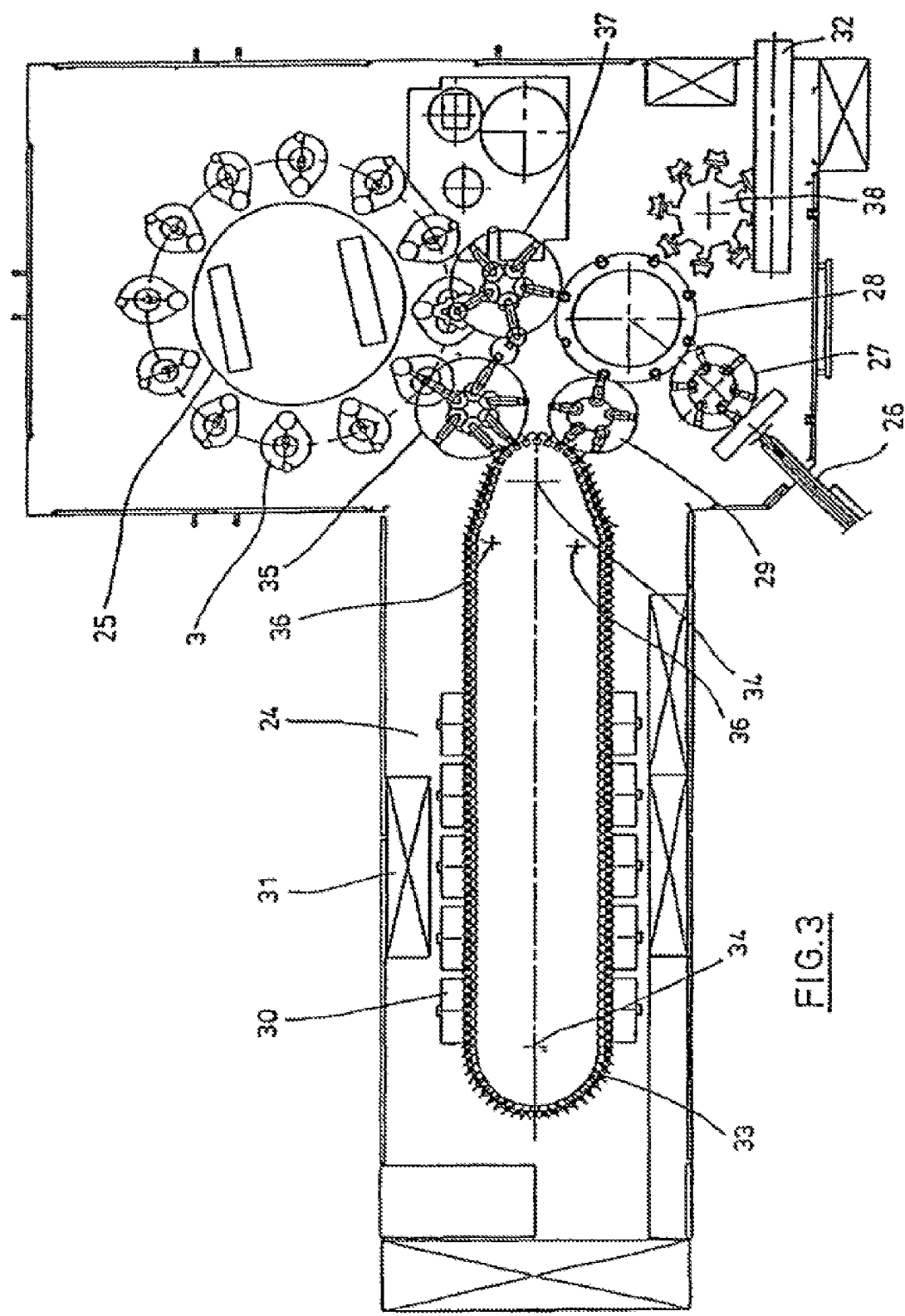
Figure 4:
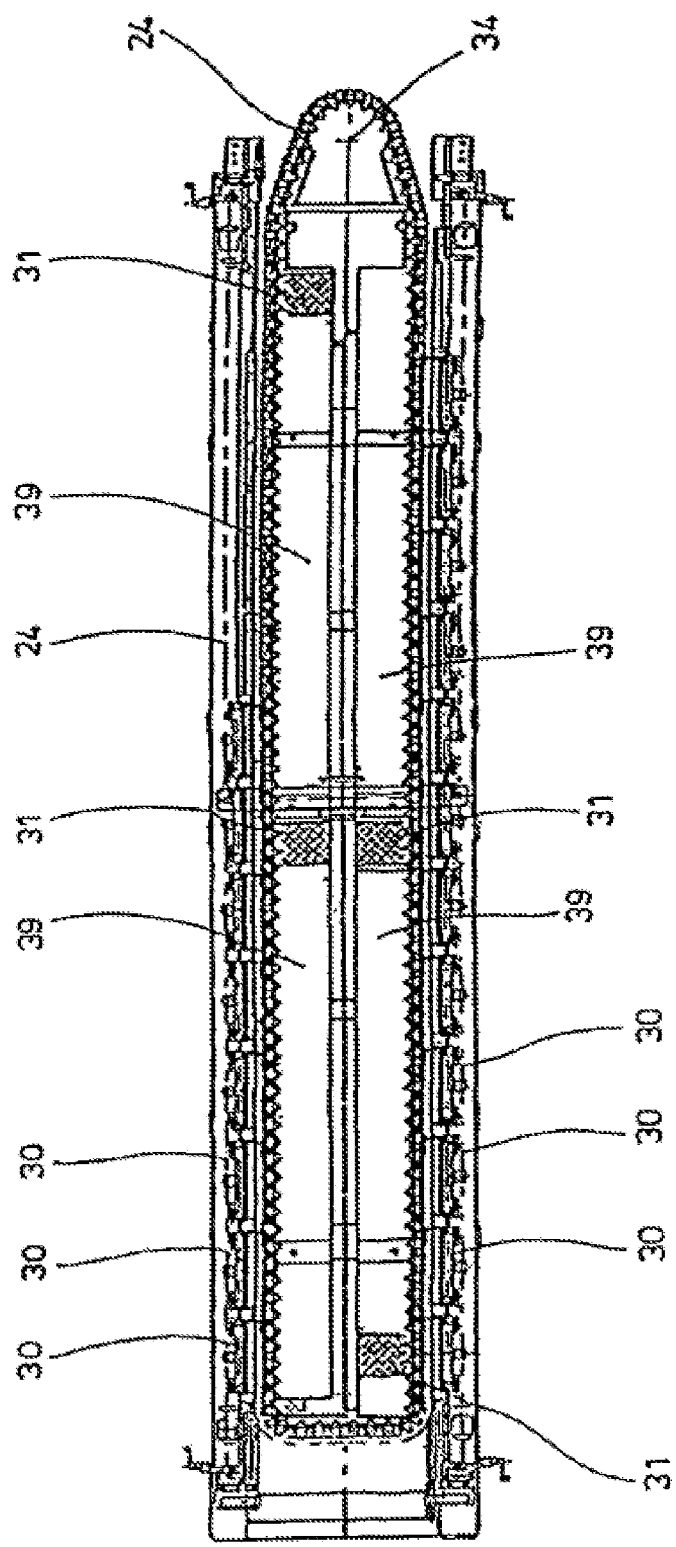
Figure 5:
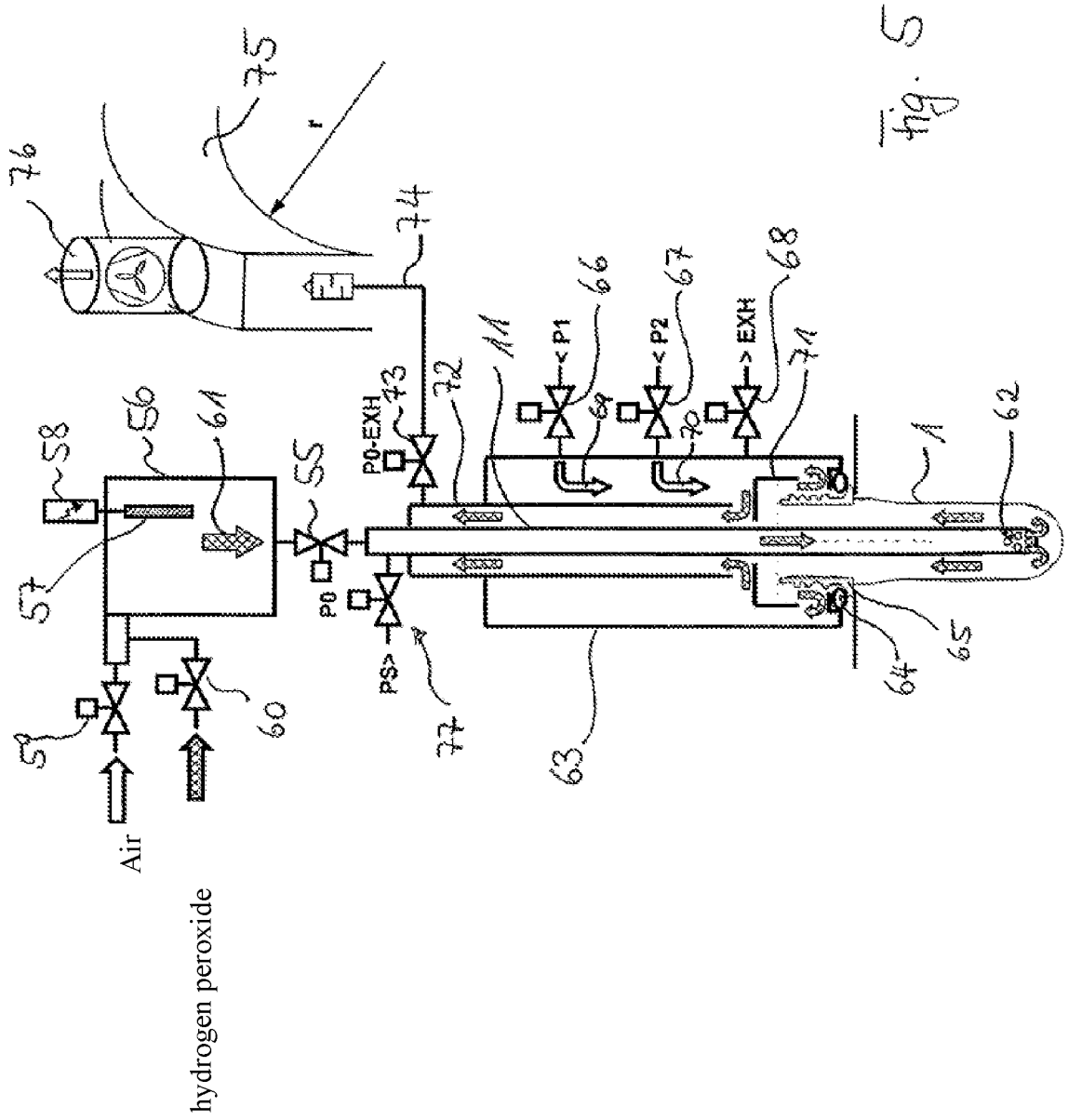
Figure 6:
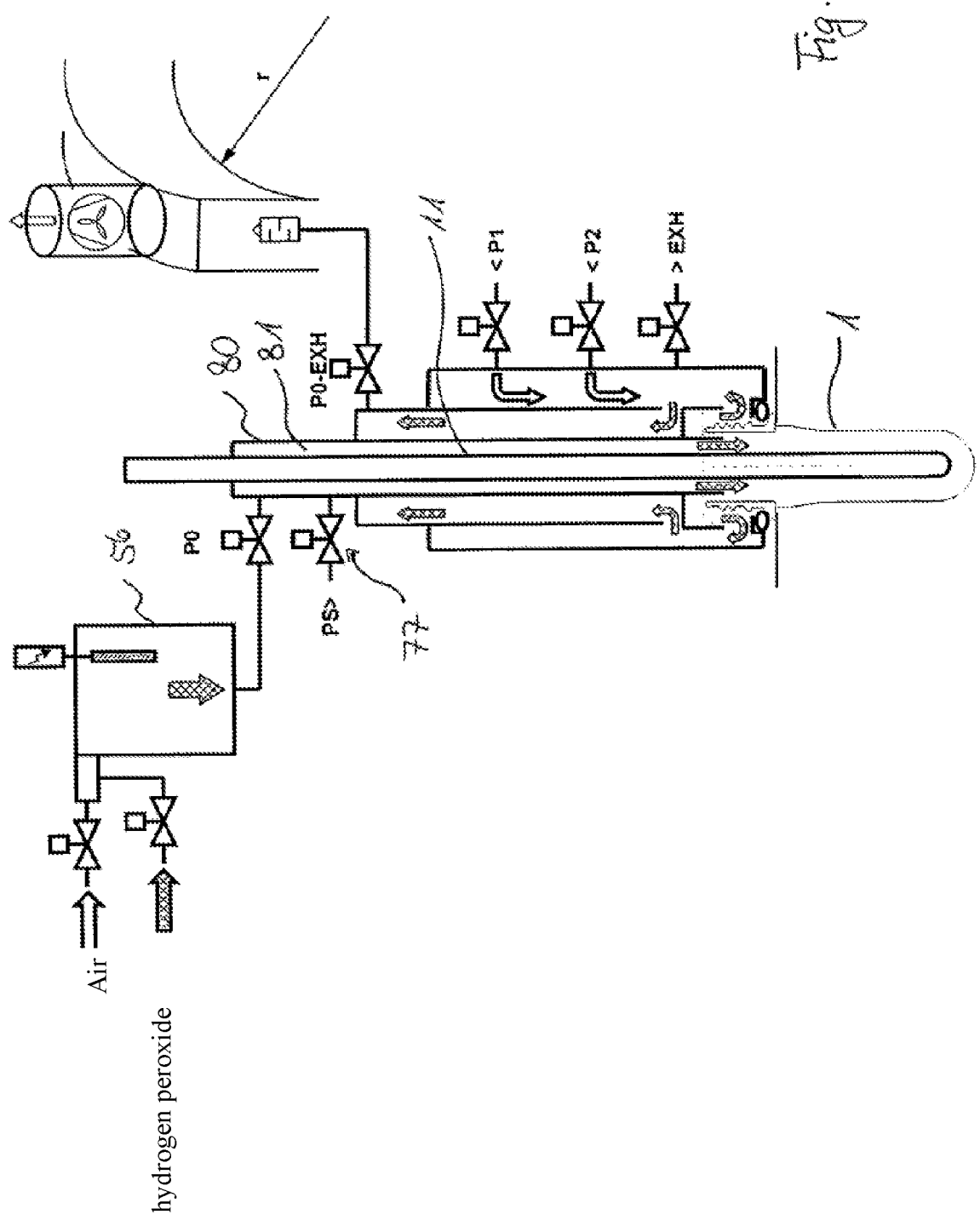

The drawings show schematically sample embodiments of the invention. There are shown:

FIG. 1, a perspective representation of a blowing station for the making of containers from preforms, FIG. 2, a longitudinal section through a blowing mold, in which a preform is being stretched and expanded, FIG. 3, a sketch to illustrate a basic layout of a device for the blow molding of containers, FIG. 4, a modified heating section with increased heating capacity, FIG. 5, a conceptual and schematic representation of the sterilization process and the blow molding process showing the flow paths of the blowing fluid and the sterilizing fluid, as well as a schematic representation of the valves commanding and controlling the process, according to a first sample embodiment, FIG. 6, a representation per FIG. 5 for a second sample embodiment, and FIG. 7, a representation per FIG. 5 for a third sample embodiment.

The basic layout of a device for the transformation of preforms 1 into containers 2 is shown in FIG. 1 and FIG. 2.

The device for molding of the container 2 consists basically of a blowing station 3, which is provided with a blow mold 4, in which a preform 1 can be placed. The preform 1 can be an injection-molded part of polyethylene terephthalate (PET). In order to make possible an inserting of the preform 1 into the blow mold 4 and a removal of the finished container 2, the blow mold 4 consists of mold halves 5, 6 and a bottom part 7, which can be positioned by a lifting device 8. The preform 1 can be supported in the region of the blowing station 3 by a transport mandrel 9, which runs through a plurality of handling stations along with the preform 1 inside the device. But it is also possible to insert the preform 1 directly into the blow mold 4 by tongs or other handling means.

To enable a supply of pressurized air, underneath the transport mandrel 9 there is arranged a blowing nozzle 10, which supplies pressurized air to the preform 1 and at the same time produces a seal against the transport mandrel 9. In a modified design, it is also basically possible to use fixed pressurized air lines.

A stretching of the preform 1 is done with the aid of a stretching rod 11, which is positioned by a cylinder 12. But it is also basically conceivable to perform a mechanical positioning of the stretching rod 11 by cam segments, which are operated by pickup rollers. The use of cam segments is especially advisable when a plurality of blowing stations 3 are arranged on a rotating blowing wheel. A use of cylinders 12 is advisable when stationary blowing stations 3 are provided.

In the embodiment shown in FIG. 1, the stretching system is designed so that a tandem arrangement of two cylinders 12 is provided. At first, before the start of the actual stretching process, the stretching rod 11 is moved by a primary cylinder 13 into the region of a bottom 14 of the preform 1, during the actual stretching process the primary cylinder 13 with extended stretching rod is positioned, together with a carriage 15 carrying the primary cylinder 13, by a secondary cylinder 16 or through a cam control. In particular, the secondary cylinder 16 should be used under cam control so that a current stretching position is determined by a guide roller 17, which slides along a camway during the performance of the stretching process. The guide roller 17 is pressed by the secondary cylinder 16 against the guideway. The carriage 15 slides along two guide elements 18. After a closing of the mold halves 5, 6 arranged in the region of carriers 19, 20, a locking of the carriers 19, 20 relative to each other is done with the aid of an interlock device 40.

For adapting to different shapes of a mouth segment 21 of the preform 1, the use of separate threaded inserts 22 is specified in the region of the blow mold 4 per FIG. 2.

FIG. 2 shows, in addition to the blown container 2, also the preform 1 in broken lines and a developing container bubble 23.

FIG. 3 shows the basic layout of a blowing machine, which is provided with a heating section 24 and a rotating blowing wheel 25. Starting from a preform entry 26, the preforms 1 are transported by transfer wheels 27, 28, 29 into the region of the heating section 24. Along the heating section 24 are arranged radiant heaters 30 and blowers 31, in order to regulate the temperature of the preforms 1. After an adequate tempering of the preforms 1, they are handed off to the blowing wheel 25, where the blowing stations 3 are arranged. The final blown containers 2 are taken by further transfer wheels to an output section 32.

In order to transform a preform 1 into a container 2 such that the container 2 has material properties which ensure a long period of use of foodstuffs, especially beverages, filled inside the container 2, special process steps must be observed during the heating and orienting of the preforms 1. Furthermore, advantageous effects can be achieved by observing special dimensioning rules.

Various plastics can be used as the thermoplastic material. For example, PET, PEN or PP can be used.

The expansion of the preform 1 during the orienting process is done by supply of pressurized air. The pressurized air supply is divided into a preblowing phase, in which gas, such as compressed air, is supplied with a low pressure level, and a following main blowing phase in which gas with a higher pressure level is supplied. Typically pressurized air with a pressure in the range of 10 bar to 25 bar is used during the preblowing phase and pressurized air with a pressure in the range of 25 bar to 40 bar is supplied during the main blowing phase.

It is likewise recognizable from FIG. 3 that the heating section 24 in the depicted embodiment is formed from a plurality of circulating transport elements 33, arranged in the form of a chain and guided along deflection wheels 34. In particular, the intention is for the chainlike arrangement to span an essentially rectangular baseline contour. In the depicted embodiment, a single relatively large dimensioned deflection wheel 34 is used in the region of the extension of the heating section 24 facing the transfer wheel 29 and an input wheel 35 and two comparatively smaller dimensioned deflection wheels 36 are used in the region of neighboring deflections. But any other guideways are also basically conceivable.

To enable the closest possible arrangement of the transfer wheel 29 and the input wheel 35 relative to each other, the depicted arrangement proves to be especially expedient, since three deflection wheels 34, 36 are positioned in the region of the corresponding extension of the heating section 24, namely the smaller deflection wheels 36 in the region of the transfer to the linear stretches of the heating section 24 and the larger deflection wheel 34 in the immediate handover zone to the transfer wheel 29 and the input wheel 35. Alternatively to the use of chainlike transport elements 33, it is also possible to use a rotating heating wheel, for example.

After a finished blowing of the containers 2, they are taken by a removal wheel 37 out from the area of the blowing stations 3 and transported via the transfer wheel 28 and an output wheel 38 to the output section 32.

In the modified heating section 24 shown in FIG. 4, thanks to the larger number of radiant heaters 30 it is possible to regulate the temperature of a larger number of preforms 1 per unit of time. The blowers 31 here bring cooling air into the region of cooling air ducts 39, each of them opposite the associated radiant heaters 30 and delivering cooling air through outlet openings. Thanks to the arrangement of the outflow directions, a flow direction for the cooling air is realized which is essentially transverse to a transport direction of the preforms 1. The cooling air ducts 39 can provide reflectors for the radiant heating in the region of surfaces opposite the radiant heaters 30. It is likewise possible to realize a cooling of the radiant heaters 30 thanks to the cooling air so delivered.

FIGS. 5 to 7 show various sample embodiments of the invention in a conceptual and schematic representation, being confined to those elements which are needed for an understanding of the sterilization process, the blow molding process and the flow path of the blowing fluid and the sterilizing fluid. The same parts in the sample embodiments are given the same reference numbers.

The stretching rod 11 shown in FIG. 5 is configured as a hollow stretching rod. In the depicted operating state, the stretching rod 11 has been introduced into the preform 1, yet is still at a height above the bottom of the preform. At the inlet side of the stretching rod 11, that is, at the side away from the bottom of the preform, the channel running through the stretching rod is controlled by a valve 55, which lets the sterilizing agent flow into the stretching rod 11 with a pressure P0 under corresponding actuation. At the inlet side of the valve 55 there is arranged an evaporator 56. The evaporator 56 has a heater 57 and a heating controller 58. A temperature sensor, not shown, can also be arranged in the evaporator 56 in order to provide temperature readings to the heating controller 58. In the evaporator 56, air which is fed into the evaporator 56 at the inlet side by an air supply valve 59 and hydrogen peroxide which is fed in a liquid state of aggregation and controlled at the inlet side of the evaporator 56 by a valve 60 are evaporated to a gaseous mixture of hydrogen peroxide and conveyed in the direction of the arrow 61 to the stretching rod 11.

The hydrogen peroxide mixture flows through the stretching rod 11 to its end near the preform, where the stretching rod 11 has outlet openings 62. These outlet openings 62 are disposed in proximity to the tip of the stretching rod and thus next to the bottom of the preform. The hydrogen peroxide mixture leaves the stretching rod 11 through these outlet openings and strikes the bottom of the preform at first. The hydrogen peroxide mixture then flows at the outlet side along the stretching rod 11 and along the interior wall of the preform in the direction of the mouth region of the preform 1.

In the operating state shown in FIG. 5, the blowing nozzle 63 is lowered tightly against the preform 1. The seal is accomplished by an O-ring 64 at the encircling neck ring 65 of the preform 1. In this operating state, the blowing process for the blow molding of the preform 1 into a container 2 can be carried out. For this, valves 64, 65 and 66 are arranged on the blowing nozzle 63, which serve on the one hand for a controlled supply of the blowing pressure P1, a controlled supply of the main blowing pressure P2, and finally a controlled pressure relief through the pressure vent valve 68. The blowing gas flowing through the mentioned valves in the direction of the preform is indicated by the arrows 69 and 70.

Yet before blowing air is brought into the preform 1, there is a supplying of sterilizing air, namely, the hydrogen peroxide mixture in the sample embodiment shown, which after emerging from the preform 1 is prevented from directly flowing back in by a guide element 71 and deflected in its direction of flow so that it flows along the threaded region of the preform 1 in the direction of the bottom before again changing its flow direction and flows away from the preform 1 to a diversion device 72. This diversion device 72 is provided with a relief valve 73 at its outlet end. A drainage element 74 located after this valve 73 allows the hydrogen peroxide to drain into a stationary annular channel 75. Preferably all drainage elements of the blowing stations arranged on the blowing wheel empty into this annular channel 75. The annular channel 75 has a fan 76 to draw in and deliver the incoming sterilizing gas mixture.

Optionally, a flushing of the preform can occur between the described sterilizing process and the blowing process. For this, the stretching rod 11 has an inlet valve 77 on its extension away from the preform, through which flushing air, for example, can be fed into the preform through the stretching rod 11. This flushing air follows the flow path previously described for the hydrogen peroxide mixture and is thus admitted into the annular channel 75 at the end of its flow path.

FIG. 6 shows a second sample embodiment, which will only be described afterwards to the extent that it differs from the sample embodiment of FIG. 5.

The stretching rod 11 of FIG. 6 is not hollow. The feeding of the hydrogen peroxide mixture occurs via a feed element 80, fashioned as a sleeve and surrounding the stretching rod 11 to form an annular channel 81. At the inlet end of the feeding device 80, away from the preform 1, the hydrogen peroxide mixture created by an evaporator 56 is fed to the annular channel 81. The sterilizing mixture flows along the stretching rod 11 and enters the preform 1 at the open outlet end of the sleeve 80. The outlet end of the sleeve 80, unlike what is shown in FIG. 6, can be disposed near the bottom of the preform in order to reliably direct the hydrogen peroxide mixture against the bottom of the preform. After the hydrogen peroxide mixture flows out from the sleeve 80, the sterilizing fluid flows along the inner wall of the preform and the outer wall of the stretching rod, then exiting from the preform through the mouth. The rest of the flow path and the rest of the layout correspond to the sample embodiment depicted in FIG. 5.

The sample embodiment of FIG. 7 differs from the two previously described sample embodiments on the one hand in that no evaporator is provided, but instead a sterilization medium is fed to the blowing station already suitable for use. Moreover, the sample embodiment of FIG. 7 differs from the other two described sample embodiments in that the feeding device 90 is arranged at the side along the stretching rod 11 and does not radially enclose the stretching rod 11. Accordingly, the sterilization medium enters the preform 1 off-center, for example, flowing in the direction of the bottom on the depicted left half side of the preform 1 and in the direction of the mouth on the right half side, after a reversal of movement has occurred in the bottom region. The flow path after leaving the preform 1 once more corresponds to the sample embodiments of FIGS. 5 and 6, so that no further explanations are needed for this.

What is common to all sample embodiments is that the sterilization medium is guided both along the stretching rod and also along the inner wall of the preform. The critical regions of the blowing nozzle needed for sterility are also swept by the sterilization medium and thereby kept free of germs or made germ-free. What is also common to all sample embodiments is that the sterilization of these three important components to the sterility occurs at the same time, because the flow path of the sterilization medium is chosen accordingly. What is also common to all sample embodiments is that the flow path is deliberately formed so that a flow of the sterilization medium occurs along the threaded region of the preform.

The invention claimed is:

1. A method for the production of a blow-molded container that is sterile at least in certain regions using a blow-molding machine, the method comprising:
   heating a preform made of thermoplastic material;
   stretching the heated preform in a blowing station of the blow-molding machine using a stretching rod;
   supplying a sterilizing fluid into the preform in the blowing station to perform a sterilization; and
   subjecting the stretched preform to a pressurized blowing fluid via a blowing nozzle in the blowing station to expand the preform and form the blow-molded container;
   wherein the sterilizing fluid is supplied into the preform in the blowing station from an outlet and flows continuously along a flow path that passes through or beside the stretching rod and, after exiting the preform, is drained away via an inlet,
   wherein the sterilizing fluid is supplied into the preform while the blow-molding machine operates in a continuous manner,
   wherein the sterilizing fluid supplied to the preform does not expand the preform to form the blow-molded container during the sterilization,
   wherein the stretched preform is subjected to the pressurized blowing fluid to expand the preform and form the blow-molded container only after the sterilization with the sterilizing fluid has been completed, and
   wherein the sterilizing fluid and the pressurized blowing fluid are different fluids.

2. The method according to claim 1, wherein the sterilizing fluid is guided by guiding devices so that it sweeps an inner wall of the preform up to and including a sealing surface for a container closure.

3. The method according to claim 2, wherein the sterilizing fluid is guided to also sweep a thread region of the preform.

4. The method according to claim 1, wherein the sterilizing fluid is fed through the stretching rod.

5. The method according to claim 1, wherein the sterilizing fluid used is a mixture of warm air and evaporated hydrogen peroxide.

6. The method according to claim 1, wherein the stretching rod before or during the sterilization is lowered to the bottom of the preform, and wherein the stretching rod forms the outlet via outlet openings for the sterilizing fluid that are formed in an end tip region of the stretching rod.

7. The method according to claim 1, wherein the blowing station is arranged on a rotating blowing wheel.

8. The method according to claim 1, wherein the outlet is arranged at least for a time in a vicinity of a bottom of the preform.

9. The method according to claim 1, wherein the inlet is arranged at least for a time above the outlet.

10. The method according to claim 1, wherein a continuous flow of sterilizing fluid is produced between the outlet and the inlet and is directed along the preform and the stretching rod and the blowing nozzle during the sterilization of the preform.

11. The method according to claim 1, wherein the preform is flushed with a sterile flushing fluid between the completion of the sterilization and the blow-molding of the preform to form the container.

12. The method according to claim 3, wherein the sterilizing fluid is guided to also sweep the thread region of the preform up to a support ring.

13. The method according to claim 4, wherein the sterilizing fluid is drained away through the blowing nozzle.

14. The method according to claim 5, wherein an evaporator for the hydrogen peroxide is arranged on a blowing wheel.

\* \* \* \* \*